(12) United States Patent
Chen

(10) Patent No.: US 12,713,102 B2
(45) Date of Patent: Aug. 18, 2026

(54) SUBTITLE RENDERING METHOD AND DEVICE FOR VIRTUAL REALITY SPACE, EQUIPMENT AND MEDIUM

(71) Applicant: BEIJING ZITIAO NETWORK TECHNOLOGY CO., LTD., Beijing (CN)

(72) Inventor: Yepeng Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/042,259

(22) PCT Filed: Nov. 3, 2022

(86) PCT No.: PCT/CN2022/129381
§ 371 (c)(1),
(2) Date: Feb. 20, 2023

(87) PCT Pub. No.: WO2023/221409
PCT Pub. Date: Nov. 23, 2023

(65) Prior Publication Data

US 2024/0276068 A1 Aug. 15, 2024

(30) Foreign Application Priority Data

May 20, 2022 (CN) ......................... 202210556153.9

(51) Int. Cl.
*H04N 21/488* (2011.01)
*G06F 3/01* (2006.01)
(Continued)

(52) U.S. Cl.
CPC ......... *H04N 21/4884* (2013.01); *G06F 3/013* (2013.01); *G06T 17/00* (2013.01); *H04N 21/4312* (2013.01)

(58) Field of Classification Search
CPC ............ H04N 21/4884; H04N 21/4312; G03F 3/013; G06T 17/00
See application file for complete search history.

(56) References Cited

U.S. PATENT DOCUMENTS

2013/0194305 A1 8/2013 Kakuta et al.
2017/0295363 A1 10/2017 Kikuchi
(Continued)

FOREIGN PATENT DOCUMENTS

CN 106412718 A 2/2017
CN 106454480 A 2/2017
(Continued)

OTHER PUBLICATIONS

European Search Report for EP Patent Application No. 22847111.6, Issued on Feb. 27, 2024, 9 pages.
(Continued)

*Primary Examiner* — Rong Le

(57) ABSTRACT

The embodiment of the disclosure relates to a caption rendering method and device for a virtual reality space, equipment and a medium, and the method includes the steps: separating caption content and picture content on a currently played virtual reality video frame, and mapping and rendering the picture content to a virtual reality panoramic space; determining a target space position in the virtual reality panoramic space according to the current sight direction of the user; and rendering the subtitle content at the target spatial position to generate spatial subtitles.

18 Claims, 8 Drawing Sheets

(51) Int. Cl.
*G06T 17/00* (2006.01)
*H04N 21/431* (2011.01)

(56) References Cited

U.S. PATENT DOCUMENTS

| | | | | |
|---|---|---|---|---|
| 2018/0095635 | A1 | 4/2018 | Valdivia et al. | |
| 2019/0206128 | A1 | 7/2019 | Logan et al. | |
| 2019/0320157 | A1 * | 10/2019 | Hwang ................ | H04N 13/178 |
| 2020/0112712 | A1 | 4/2020 | Koblin et al. | |
| 2020/0312025 | A1 | 10/2020 | Mate et al. | |

FOREIGN PATENT DOCUMENTS

| | | | | | |
|---|---|---|---|---|---|
| CN | 106937156 | A | | 7/2017 | |
| CN | 107613405 | A | * | 1/2018 | |
| CN | 108604438 | A | | 9/2018 | |
| CN | 109937394 | A | | 6/2019 | |
| CN | 112532962 | A | * | 3/2021 | ........... H04N 13/183 |
| CN | 114900625 | A | | 8/2022 | |
| JP | 2012048597 | A | | 3/2012 | |
| JP | 2018-136944 | A | | 8/2018 | |
| KR | 10-1965404 | B1 | | 4/2019 | |

OTHER PUBLICATIONS

Shimizu et al., "Gaze-Adaptive Subtitles Considering the Balance among Vertical/Horizontal and Depth of Eye Movement", IEEE International Symposium on Mixed and Augmented Reality Adjunct, vol. 01, Nov. 3, 2021, pp. 1-6.

Office Action received for Chinese Patent Application No. 202210556153.9, mailed on Jan. 27, 2025, 20 pages (10 pages of English Translation and 10 pages of Original Document).

* cited by examiner

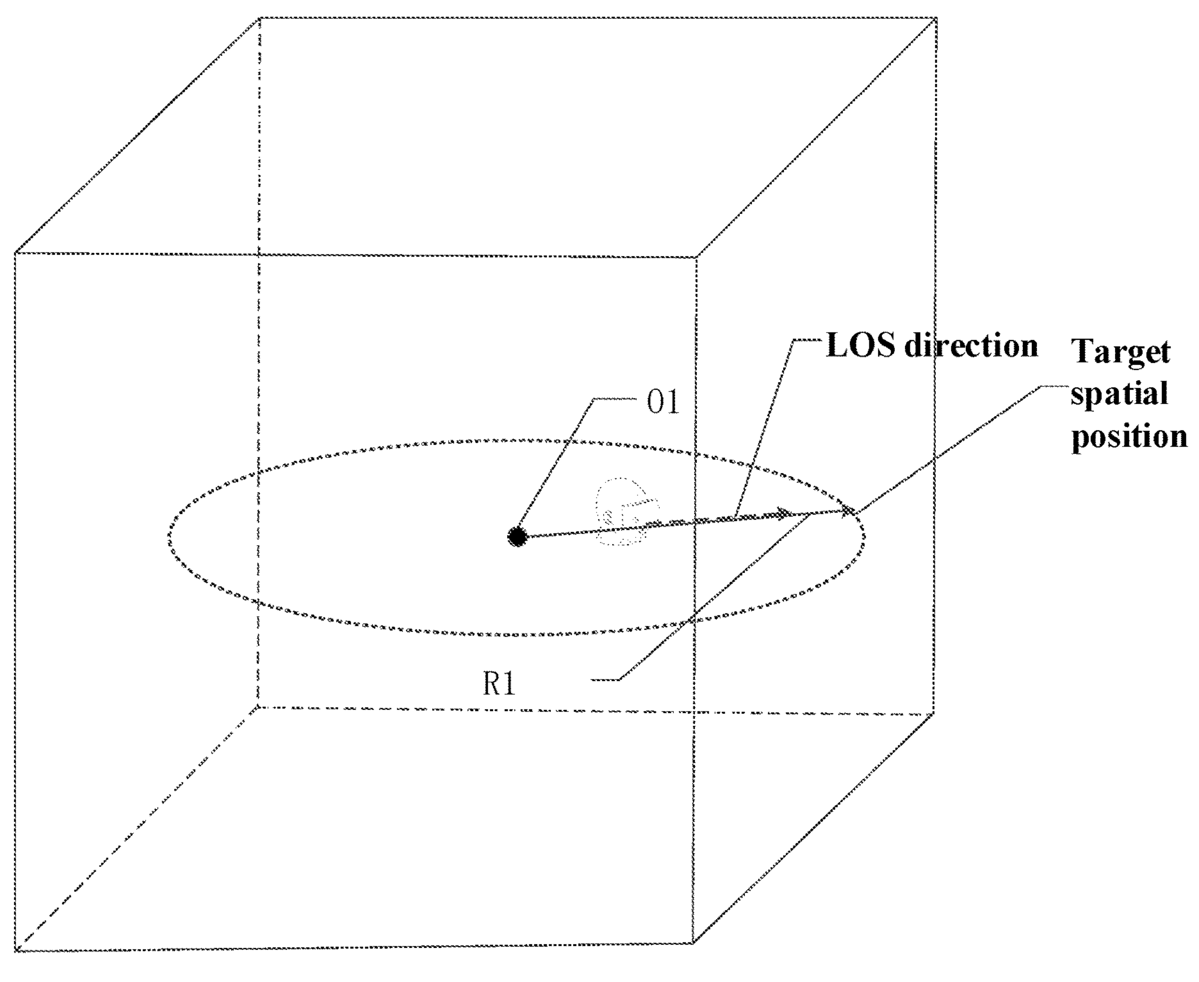

FIG. 6 acquiring a historical spatial position corresponding to the caption content of a previous frame displayed in the VR panoramic space — 701

↓ acquiring LOS change information of the user's current LOS direction with respect to the user's LOS direction when the previous frame is viewed — 702

↓ determining the target spatial position according to the LOS change information and the historical spatial position — 703

FIG. 7

SUBTITLE RENDERING METHOD AND DEVICE FOR VIRTUAL REALITY SPACE, EQUIPMENT AND MEDIUM

CROSS-REFERENCE TO RELATED APPLICATIONS

The present disclosure is a U.S. National Stage Application under 35 U.S.C. § 371 of International Patent Application No. PCT/CN2022/129381, filed on Nov. 3, 2022, which is based on and claims priority of Chinese application for invention No. 202210556153.9, filed on May 20, 2020, the disclosure of which is hereby incorporated into this disclosure by reference in its entirety.

TECHNICAL FIELD

The present disclosure relates to the field of vision processing technology, in particular to a method, apparatus, device and medium for caption rendering in a virtual reality space.

BACKGROUND

Virtual Reality (VR), involving computer, electronic information and simulation technology, is basically realized by computers simulating virtual environments to give people a sense of environmental immersion. With the popularity of VR applications, it has become a common scene to display captions in a VR space in video display and other scenes. For example, movie captions are displayed for VR movies.

In the related technologies, captions are usually fixed on associated video pictures. For example, in movie scenes, captions are fixed on the movie pictures.

SUMMARY

An embodiment of the present disclosure provides a method for caption rendering in a virtual reality (VR) space, comprising: separating a caption content and a picture content on a currently displayed VR video frame, and mapping and rendering the picture content to a VR panoramic space; determining a target spatial position in the VR panoramic space according to a user's current LOS (line-of-sight) direction; rendering the caption content at the target spatial position to generate a spatial caption.

An embodiment of the present disclosure further provides an apparatus for caption rendering in a virtual reality (VR) space, comprising: a separation module for separating a caption content and a picture content on a currently displayed VR video frame; a mapping module for mapping and rendering the picture content to a VR panoramic space; a determination module for determining a target spatial position in the VR panoramic space according to a user's current LOS direction; a rendering module for rendering the caption content at the target spatial position to generate a spatial caption.

An embodiment of the present disclosure provides an electronic device, comprising: a processor; a memory for storing processor executable instructions; wherein the processor is used to read the executable instructions from the memory and execute the instructions to implement the method for caption rendering in a VR space provided in the embodiment of the present disclosure.

An embodiment of the present disclosure further provides a non-transitory computer readable storage medium having stored thereon a computer program that is used to implement the method for caption rendering in a VR space provided in the embodiment of the present disclosure.

An embodiment of the present disclosure further provides a computer program, comprising: instructions that, when executed by a processor, cause the processor to implement the method for caption rendering in a VR space provided in the embodiment of the present disclosure.

An embodiment of the present disclosure further provides a computer product comprising instructions that, when executed by a processor, cause the processor to implement the method for caption rendering in a VR space provided in the embodiment of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

FIG. 6 is a schematic diagram of another scene of caption rendering in a VR space provided in some embodiments of the present disclosure;

FIG. 7 is a flowchart of another method for caption rendering in a VR space provided in some embodiments of the present disclosure;

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence there between.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

As mentioned in the Background above, in the related technology, captions are fixed on video pictures. When a user's line of sight changes, a caption content fixed on a picture region may be visually distorted, thereby affecting the viewing effect.

Figure 1:
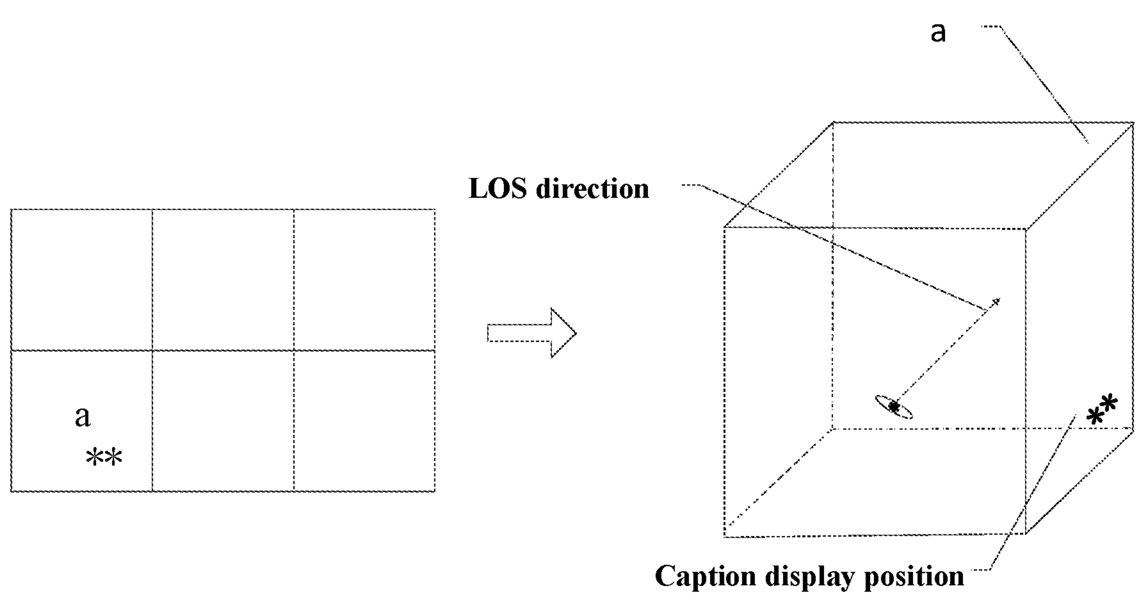
FIG. 1 is a schematic diagram of a scene of caption rendering in a VR space in related technology provided in some embodiments of the present disclosure.

That is to say, in a VR display scene, in order to achieve the stereoscopic display effect, the display orientation of movie pictures will change, resulting in visual distortion of captions that are fixed to the video pictures, thereby affecting the viewing effect. For example, a line of caption content "" is fixed on picture content A, as shown in FIG. 1**, if the virtual space is a "box" cube space, and if the user's line of sight is not in a direction directly opposite to the display position of the caption content, it is inevitable that the user has difficulty in viewing the caption content clearly, so that the user's viewing experience may be affected.

In order to solve the above technical problems or at least partially solve the above technical problems, the present disclosure provides a method, apparatus, device and medium for caption rendering in a VR space, in which the position of a caption content rendered in a VR space is determined by tracking the user's LOS direction, and a caption is rendered at the corresponding position, thereby improving the user's visual viewing experience.

The embodiment of the present disclosure provides a method for caption rendering in a VR space. In this method, the fixed position relationship between a picture content and a caption content is canceled, and the display position of a caption content can be adaptively adjusted according to the user's LOS direction, so as to avoid visual distortion of the caption content, and thereby the user's visual viewing experience can be improved.

The method will be described below in conjunction with embodiments.

Figure 2:
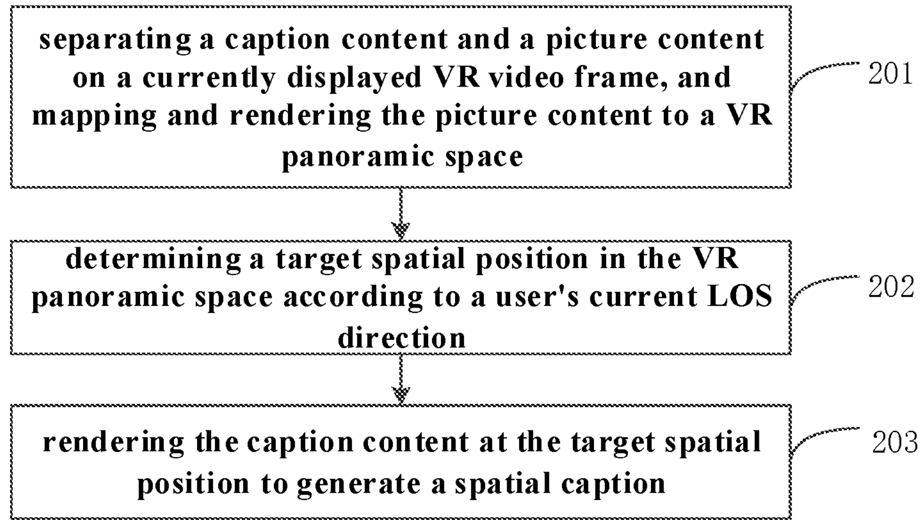
FIG. 2 is a flowchart of a method for caption rendering in a VR space provided in some embodiments of the present disclosure.

FIG. 2 is a schematic flowchart of a method for caption rendering in a VR space provided in some embodiments of the present disclosure. The method can be executed by an apparatus for caption rendering in a VR space, wherein the apparatus can be implemented by software and/or hardware, and can generally be integrated in an electronic device. As shown in FIG. 2, this method comprises the following steps.

Step 201: separating a caption content and a picture content on a currently displayed VR video frame, and mapping and rendering the picture content to a VR panoramic space.

It can be understood that VR video frames usually contain multiple picture contents, and each picture content corresponds to a plane in the VR panoramic space.

Figure 3:
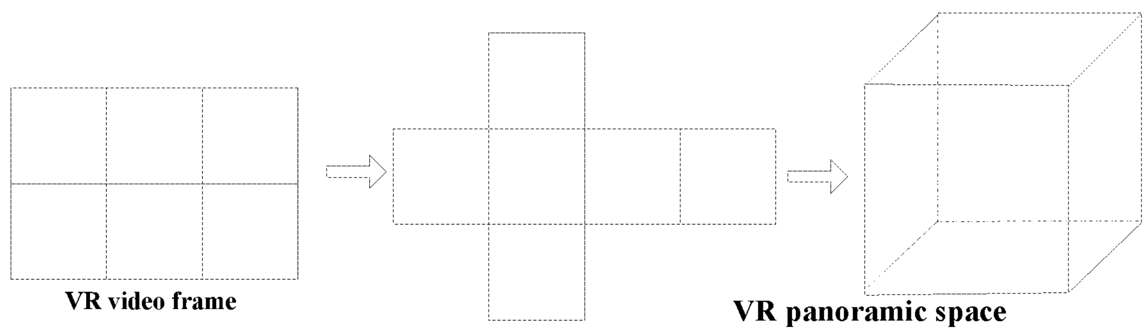
FIG. 3 is a schematic diagram of a scene of caption rendering in a VR space provided in some embodiments of the present disclosure.

For example, if the VR panoramic space is a "box" cube space, as shown in FIG. 3, the VR video frame comprises six picture regions, each picture region corresponding to a plane in the VR panoramic space. Therefore, when VR display is performed, a stereoscopic display effect can be achieved visually by displaying a corresponding picture content on each plane of the VR panoramic space.

In some embodiments, as a user's line of sight changes during a display process, in order to avoid the problem of visual distortion of a caption content due to an offset angle between a caption content and the user's line of sight, a caption content is separated from a picture content on a currently displayed VR video frame. The picture content is mapped and rendered to a VR panoramic space, wherein the mapping and rendering comprises rendering the picture content to a plane in the corresponding VR panoramic space as described above, and thus a display position of the caption content is further determined.

Step 202: determining a target spatial position in the VR panoramic space according to a user's current LOS direction.

Figure 4:
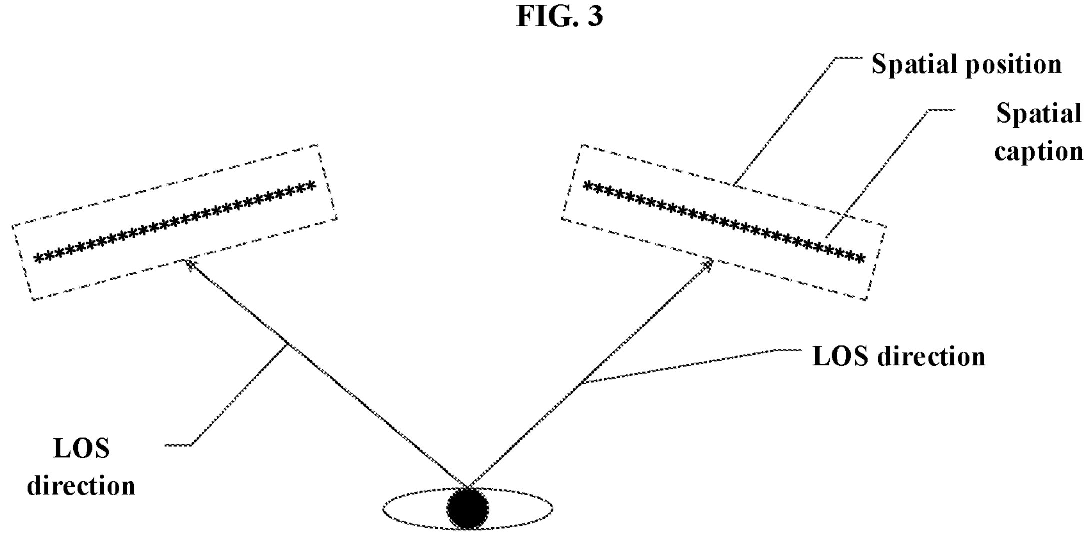
FIG. 4 is a schematic diagram of another scene of caption rendering in a VR space provided in some embodiments of the present disclosure.

In some embodiments, the target spatial position is determined in the VR panoramic space according to the user's current LOS direction. That is, the target spatial position is coincident with the user's current LOS direction. For example, as shown in FIG. 4, the target spatial position is located in the user's current LOS direction, thereby ensuring the target spatial position coincident with the LOS direction, and providing a further technical support for the content display effect.

For the way of determining a target spatial position in the VR panoramic space according to a user's current LOS direction, reference can be made to the embodiments described below, which will not be described herein.

Step 203: rendering the caption content at the target spatial position to generate a spatial caption.

In some embodiments, after the target spatial position is determined, the caption content is rendered at the target spatial position to generate a spatial caption. For example, referring to FIG. 4, if the user's LOS direction changes horizontally, the spatial caption will follow the change of the LOS direction, and will be displayed at a spatial location in the LOS direction. Because the generated spatial caption is in the user's LOS direction, it ensures that the caption content can be presented to the user without distortion, thereby ensuring the visual display effect.

To sum up, the method for caption rendering in a VR space of the embodiments of the present disclosure separates caption content and picture content on a currently displayed VR video frame, maps and renders the picture content to a VR panoramic space, and then determines a target spatial position in the VR panoramic space according to the user's current LOS direction, and renders the caption content at the target spatial position to generate a spatial caption. Therefore, the position of the caption content rendered in the VR space is determined by tracking the user's LOS direction, and a caption is rendered at the corresponding position, thereby improving the user's visual viewing experience.

Figure 5:
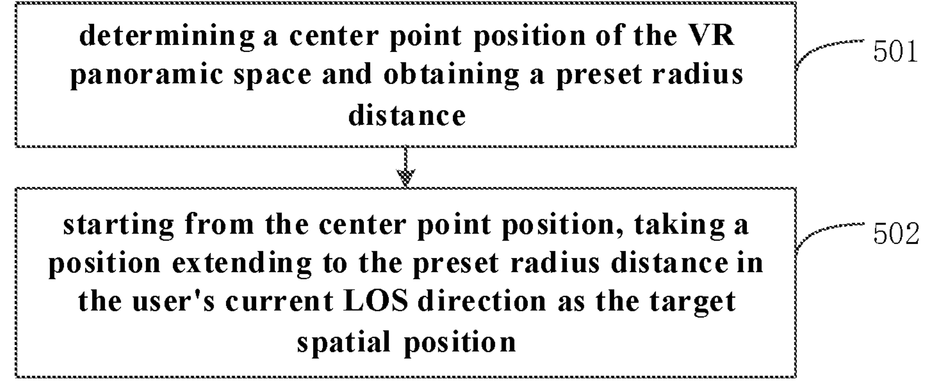
FIG. 5 is a flowchart of another method for caption rendering in a VR space provided in some embodiments of the present disclosure.

Based on the above embodiments, in different application scenarios, the method of determining a target spatial position in the VR panoramic space according to the user's current LOS direction is different, some examples of which will be given below. In some embodiments, as shown in FIG. 5, determining a target spatial position in the VR panoramic space according to a user's current LOS direction comprises the following steps.

Step 501: determining a center point position of the VR panoramic space and obtaining a preset radius distance.

In some embodiments, the center point position of the VR panoramic space is determined. The center point position is located at the center of the VR panoramic space, and is related to the shape of the VR panoramic space. After determining the center point position of the VR panoramic space, a preset radius distance is obtained. The preset radius distance can be set according to the size of the VR panoramic space in advance. Usually, a length from the preset radius distance to the center point position will not exceed a length from the center point position of the VR panoramic space to the surfaces of the VR panoramic space.

Step 502: starting from the center point position, taking a position extending to the preset radius distance in the user's current LOS direction as the target spatial position.

In some embodiments, since the length from the preset radius distance to the center point position in the VR panoramic space usually does not exceed the length from the center point position to the surfaces of the VR panoramic space, taking a position extending from the center point position to the preset radius distance in the user's LOS direction as the target spatial position. On the one hand, the above embodiments can ensure that the target spatial position is inside the virtual space, thereby ensuring the display effect; on the other hand, the above embodiments can ensure a target spatial position coincident with the LOS direction, so that the caption content displayed at the target spatial position is coincident with the user's LOS direction, ensuring that the user can clearly view the caption content, thereby improving the viewing experience.

For example, as shown in FIG. 6, the VR panoramic space is a "box" cube space, the preset radius distance is R1, and the center point position of the VR panoramic space is O1. After the user's current LOS direction is determined, a position extending to the preset radius distance along the user's current LOS direction is taken as the target spatial position.

In some embodiments, as shown in FIG. 7, determining a target spatial position in the VR panoramic space according to a user's current LOS direction comprises the following steps.

Step 701: acquiring a historical spatial position corresponding to the caption content of a previous frame displayed in the VR panoramic space.

In some embodiments, the historical spatial position corresponding to the caption content of a previous frame displayed in the VR panoramic space is acquired, wherein the historical spatial position is determined according to the user's LOS direction when the caption content of the previous frame is viewed.

Step 702: acquiring LOS change information of the user's current LOS direction with respect to the user's LOS direction when the previous frame is viewed.

The LOS change information is used to indicate a sight angle change between the user's current LOS direction and a LOS direction when the previous frame is viewed. For example, the LOS change information can comprise a direction change and a changed angle between the user's current LOS direction and a LOS direction when the previous frame is viewed by the user.

In some embodiments, a horizontal axis rotation angle of a camera in a VR device worn by the user relative to the previous frame in the horizontal direction is acquired as the LOS change information of the user's current LOS direction with respect to a LOS direction when the previous frame is viewed by the user. In some embodiments, since the LOS change information comprises change information in a horizontal LOS direction, it can ensure that the target spatial position can follow the user's LOS direction for a user who rotates left or right for viewing, further ensuring that the caption content displayed at the target spatial position is coincident with the user's LOS direction. For example, the current frame is a currently displayed VR video frame.

Step 703: determining the target spatial position according to the LOS change information and the historical spatial position. In some embodiments, after the LOS change information is determined, a target spatial position can be determined according to the LOS change information and the historical spatial position. For example, the historical spatial position can be moved according to the LOS change information to determine the target spatial position.

It should be emphasized that, in some embodiments, the target spatial position is determined only based on the LOS change information of the user's current LOS direction with respect to a LOS direction of the user when watching the previous frame, without considering a change of the user's current position with respect to a position of the user when watching the previous frame in the virtual space. That is, regardless whether the user's current position in the VR space is closer to the surface of the virtual space or farther away from the surface of the virtual space than a position of the user when watching the previous frame, the determination of the target spatial position will not be affected. The target spatial position is only related to change information of the user's current LOS direction with respect to the LOS direction of the user when the previous frame is viewed. Therefore, the user will not virtually perceive that there is a fixed display distance between the displayed caption content and the user's human eyes, which may further ensure the user's visual effect.

Figure 8:
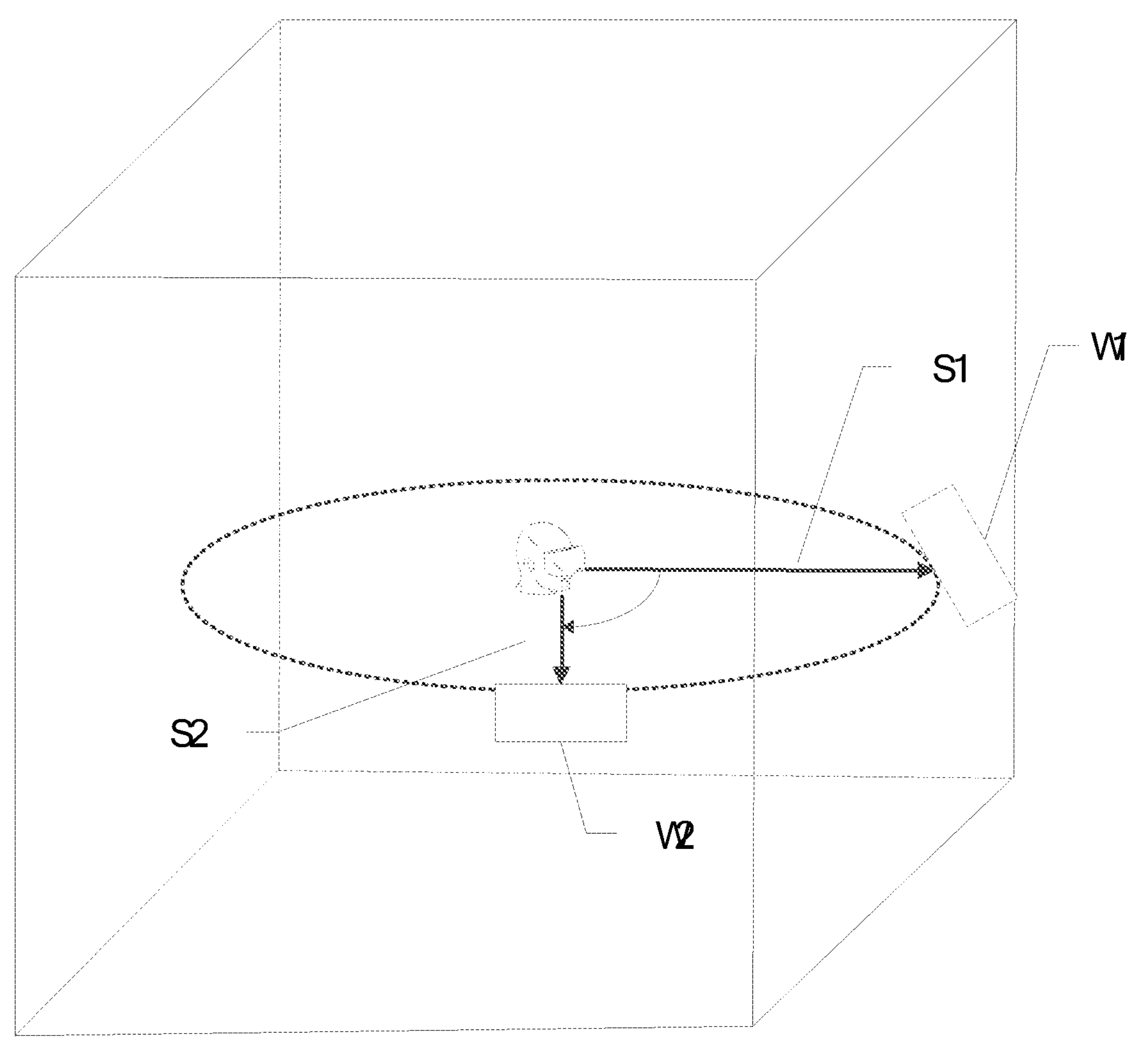
FIG. 8 is a schematic diagram of another scene of caption rendering in a VR space provided in some embodiments of the present disclosure.

For example, as shown in FIG. 8, the VR panoramic space is a "box" cube space, the historical spatial position corresponding to the caption content of the previous frame displayed in the VR panoramic space is W1. The LOS change information between the user's current LOS direction S2 and the LOS direction S1 when the previous frame is viewed is obtained as shown in the figure. The movement of the historical spatial position is controlled according to the LOS change information, and a position W2 after the movement is determined as the target spatial position.

It should be noted that, in different application scenarios, the way of determining a target spatial position according to the LOS change information and the historical spatial position is different, some examples of which will be given below.

In some embodiments, a center position of a circle preset in the VR panoramic space is acquired, wherein the center position, as a center of a circle, is usually set at the center of the VR space, to ensure that captions can be displayed within the VR space for captions surrounding and following the center of a circle.

In some embodiments, an initial position of a VR device in the VR panoramic space can be obtained, wherein the initial position is a center point position in the VR panoramic space. The VR panoramic space is built with the initial position as the center point position in the VR panoramic space. Then, the center point position in the VR panoramic space is set as a center position of a circle.

In some embodiments, although the initial position of the VR device in the VR panoramic space is taken as the center position, in actual implementations, when the VR device is moved in the VR panoramic space, the center point position is still taken as the center position, instead of taking the user's VR head mounted display device as the center position of a circle in the VR panoramic space. Visually separating parameters irrelevant to the LOS direction, such as a moving distance of the VR head mounted display device, from the display position of the caption content can improve the visual display effect, and avoid caption content that always moves along with the VR head mounted display device if the display position of the caption content is constantly associated with the moving distance of the VR head mounted display device, which may affect the user's visual experience.

In some embodiments, after obtaining the center position of a circle, using the horizontal axis rotation angle as a center rotation angle from the previous frame to the current frame, a historical spatial position of the caption content of the previous frame relative to the center position is determined, and then a target spatial position is determined according to the center position, the historical spatial position, and the center rotation angle.

Figure 9:
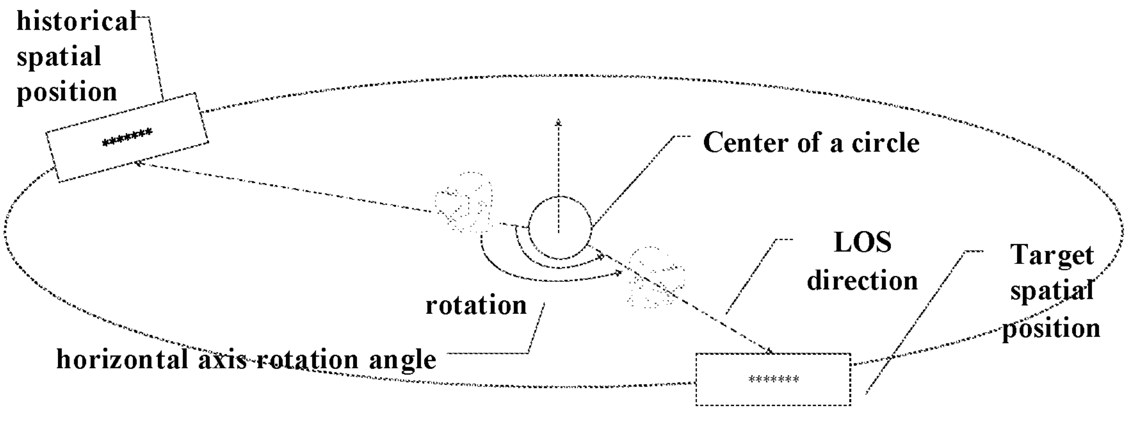
FIG. 9 is a schematic diagram of another scene of caption rendering in a VR space provided in some embodiments of the present disclosure.

For example, as shown in FIG. 9, after acquiring a horizontal axis rotation angle of a camera provided in the VR device worn by the user relative to the previous frame in the horizontal direction, a center position of a circle preset in the VR panoramic space is obtained, and the horizontal axis rotation angle is used as a center rotation angle of a rotation root node. Then, a historical spatial position of the caption content of the previous frame relative to the center position of a circle is determined. Through rotating according to the center rotation angle, the caption content is rotated with the center position as a rotation center to a target spatial position coincident with the user's LOS direction from the historical spatial position, so as to ensure the display effect of caption content subsequently displayed at the target spatial position.

In some embodiments, a neural network model can be trained using sample data in advance. The center of a circle position, historical spatial position, and horizontal axis rotation angle can be input into the neural network model, to output a corresponding target spatial position in the VR panoramic space in a current LOS direction.

In other embodiments, a preset algorithm can be used to calculate the corresponding target spatial position in the VR panoramic space in the current LOS direction. The preset algorithm can be expressed by the following formula (1), wherein, in formula (1), x, y, z are coordinates of a historical spatial position on the three coordinate axes respectively, x1, y1, and z1 are coordinates of a target spatial position on the three coordinate axes, θ is the center rotation angle, Tx, Ty and Tz are coordinates of the center position of a circle on the three coordinate axes.

$$\begin{bmatrix} x1 \\ y1 \\ z1 \\ 1 \end{bmatrix} = \begin{bmatrix} \cos\theta & 0 & \sin\theta & Tx \\ 0 & 1 & 0 & Ty \\ -\sin\theta & 0 & \cos\theta & Tz \\ 0 & 0 & 0 & 1 \end{bmatrix} \begin{bmatrix} x \\ y \\ z \\ l \end{bmatrix} \quad \text{(Formula 1)}$$

For the first frame's caption content to be currently displayed first, a preset radius distance can be obtained. An initial spatial position of the caption content of the initial frame relative to the center position of a circle can be determined according to the center position of a circle, radius distance, and the user's initial LOS direction, which will be used as the rendering position of the caption content of the first frame.

It is easy to understand that when determining a target spatial position according to a center position of a circle, a historical spatial position, and a horizontal axis rotation angle as described above, in order to ensure the LOS tracking effect of the target spatial position, in actual implementations, different function nodes can be provided based on an engine architecture to achieve the consistency of the target spatial position and the user's line of sight through the cooperation of different function nodes.

Figure 10A:
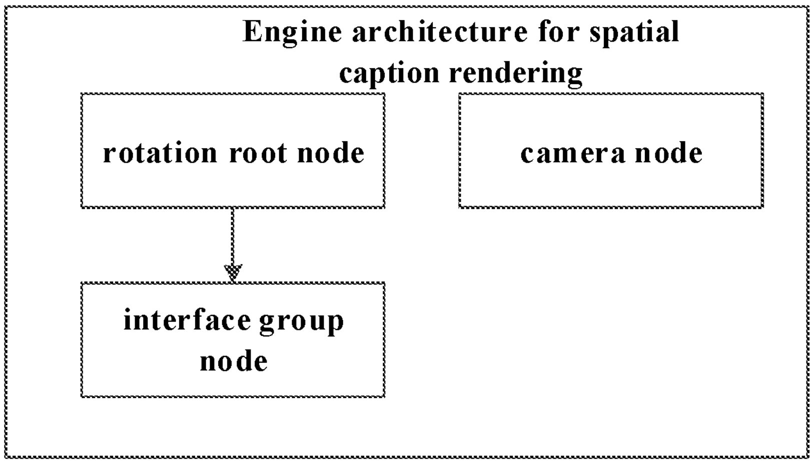
FIG. 10A is a schematic diagram of another scene of caption rendering in a VR space provided in some embodiments of the present disclosure.

In some embodiments, caption rendering is performed based on an engine architecture for spatial caption rendering. As shown in FIG. 10A, the engine architecture comprises a camera node in the VR device worn by the user, a rotation root node that acts as a center of a circle to achieve caption surrounding and tracking the center of a circle, and an interface group node that displays captions. The rotation root node is the parent node of the interface group node, and the camera node and the rotation root node are nodes at the same level. In some embodiments, the interface group node, as a sub node of the rotation root node, makes a linked change according to the center position center of a circle of the rotation root node and/or a center angle.

In some embodiments, the above rotation root node is usually set at, as a center of a circle, the center position of the VR space to ensure that captions can be displayed in the VR space for captions surrounding and tracking the rotation root node as the center of a circle. In some embodiments, an initial position of the user's VR head mounted display device in a VR panoramic space is obtained. That is, in a VR scene, an initial position of the user's VR head mounted display device in the VR panoramic space is used as the center point position of the camera node in the VR panoramic space to build the VR panoramic space, and then the center point position of the camera node in the VR panoramic space is set as the position of the rotation root node acting as the center of a circle.

The camera node is invoked to obtain a horizontal axis rotation angle of the camera relative to a previous frame when frame switching occurs. The horizontal axis rotation angle is change information from the user's horizontal LOS direction when the previous frame is viewed to the user's horizontal LOS direction when the currently displayed virtual reality video frame is viewed.

In some embodiments, a horizontal axis rotation angle of the camera node from the currently displayed VR video frame to the previous frame is obtained, wherein the horizontal axis rotation angle is the information about the change in the user's horizontal LOS direction when the previous frame is switched to the current frame, that is, a Y-axis rotation angle of the camera node, as well as a horizontal rotation direction, for the currently displayed VR video frame relative to the previous frame are obtained. In addition, the horizontal axis rotation angle is used as a center rotation angle relative to the previous frame when frame switching occurs.

Furthermore, the rotation root node is invoked to obtain a real-time center position of a circle and a center rotation angle relative to the previous frame during frame switching. The center rotation angle reflects a rotation change of the camera node. Therefore, it can be ensured that the real-time position of the caption content of each frame relative to the center position obtained by invoking the interface group node is coincident with the LOS direction of each frame.

In some embodiments, the horizontal axis rotation angle is used as the center rotation angle of the rotation root node, and the interface group node is invoked to obtain a historical spatial position of the interface group node in the VR panoramic space when the previous frame is displayed. Since the rotation root node and the interface group node are parent-child nodes, based on the parent-child relationship between the rotation root node and the interface group node, a current target spatial position of the interface group node in the VR panoramic space is determined based on the center position, the center rotation angle and the historical spatial position.

In some embodiments, the rotation root node rotates according to the control of the center rotation angle and the historical spatial position. Because there is a parent-child relationship between the rotation root node and the interface group node, and for parent and child nodes, the child node will move with the movement of the parent node, in some embodiments, based on the parent-child relationship between the rotation root node and the interface group node, the rotation root node is controlled to rotate according to the center rotation angle, so as to drive the interface group node to rotate from the historical spatial position. The determination of the target spatial position can be realized through the rotation of the interface group node.

Figure 11:
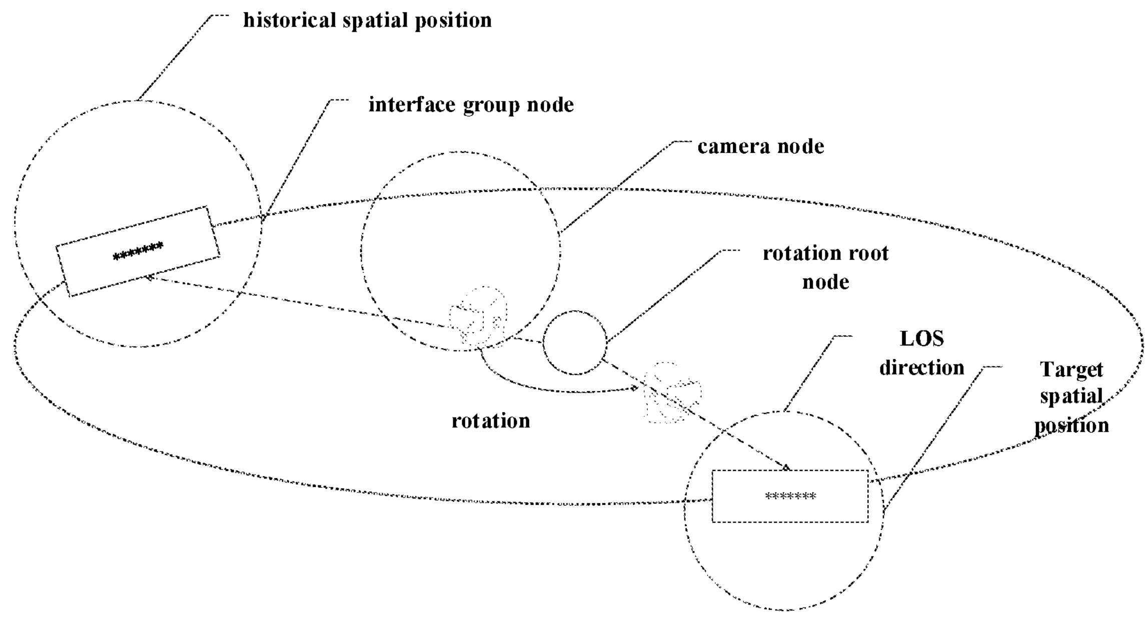
FIG. 11 is a schematic diagram of another scene of caption rendering in a VR space provided in some embodiments of the present disclosure.

For example, as shown in FIG. 11, after obtaining the camera node's horizontal axis rotation angle measured for a currently displayed video frame relative to a previous frame, the horizontal axis rotation angle is used as a center rotation angle of the rotation root node. Then, the rotation root node is controlled to rotate according to the center rotation angle to drive the interface group node to rotate from the historical space position to the target spatial position coincident with the user's LOS direction, so as to ensure the display effect of caption content subsequently displayed at the target spatial position.

In order to avoid a fixed-map tracking effect of the displayed caption content that tracks the user's VR head mounted display device, a distance between the rotation root node and the interface group node is set. The distance is a radius distance of the rotation root node that acts as the center of surround caption rendering. An initial position of the interface group node is determined according to the position and radius distance of the rotation root node acting as the center, and an initial orientation of the VR head mounted display device, wherein the initial orientation of the VR head mounted display device is an initial LOS direction.

In some embodiments, when the camera node moves with the VR head mounted display device, instead of taking the user's VR head mounted display device as the center position in the VR panoramic space, the center point position of the camera node in the VR panoramic space is still taken as the position of the rotation root not that acts as the center. Visually separating parameters irrelevant to the LOS direction, such as a moving distance of the VR head mounted display device, from the display position of the caption content can improve the visual display effect, and avoid caption content that always moves along with the VR head mounted display device if the display position of the caption content is constantly associated with the moving distance of the VR head mounted display device, which may affect the user's visual experience.

Figure 10B:
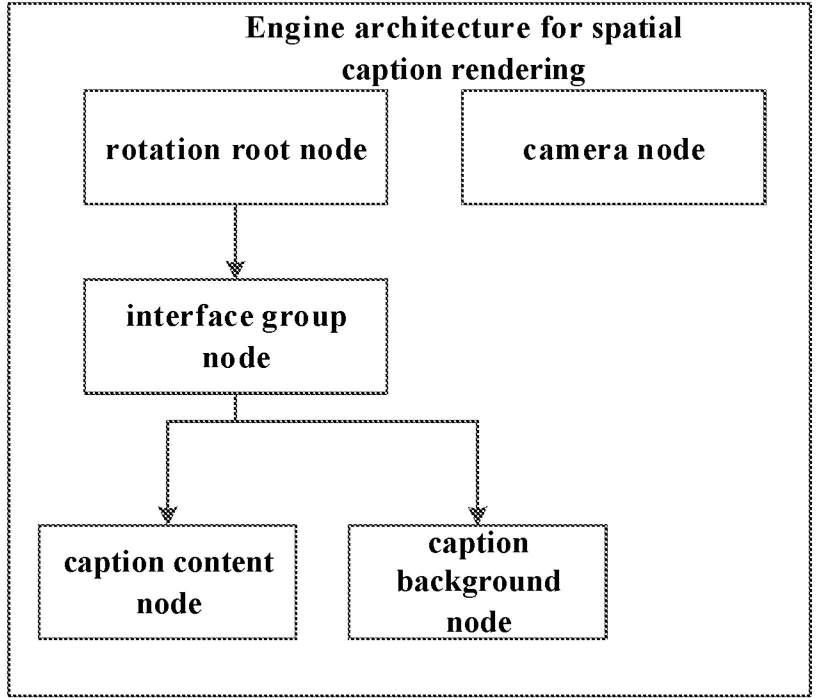
FIG. 10B is a schematic diagram of another scene of caption rendering in a VR space provided in some embodiments of the present disclosure.

In some embodiments, as shown in FIG. 10B, the engine architecture further comprises: a caption content node and a caption background node, wherein the interface group node is the parent node of the caption content node and the caption background node, and the caption content node and the caption background node are nodes at the same level. The caption content node and the caption background node surround the rotation root node that acts as the center following the interface group node and facing the center through the parent-child relationship. The caption content node is used to render the displayed caption content, and the caption background node is used to render a background layer for the displayed caption content. The style of the background layer can be calibrated according to a specific scene, and may comprise, but is not limited to, color, transparency, shape, etc.

In some embodiments, the caption content node and the caption background node, following the interface group node through the parent-child relationship and facing the center of a circle, surround the rotation root node that acts as the center of a circle, so that the caption content node and the caption background node can render following the target spatial position determined by the interface group node.

In an actual implementation process, in order to further improve the visual display effect, the display effect of the caption background layer can also be adjusted adaptively according to the specific situation of the caption content. In some embodiments, in response to a caption content input in real time in a corresponding area of the target spatial position, a background interface matching the caption content is synchronously displayed, wherein the background interface changes with the caption content input in real time. In some embodiments, a change of the above background layer matching the caption content comprises an associated change in the size of the background interface according to the real-time input caption content. In some embodiments, when the width of the real-time input caption is less than or equal to a preset maximum caption line width, a display width of the real-time background is determined in the caption background node according to the width of the real-time input caption based on a per-caption-unit width in the caption content node, and a per-caption-unit-background width. The maximum caption line width can be determined according to a scene. Generally, the maximum caption line width restricts the displayed caption content to the best viewing range of the user.

Figure 12A:
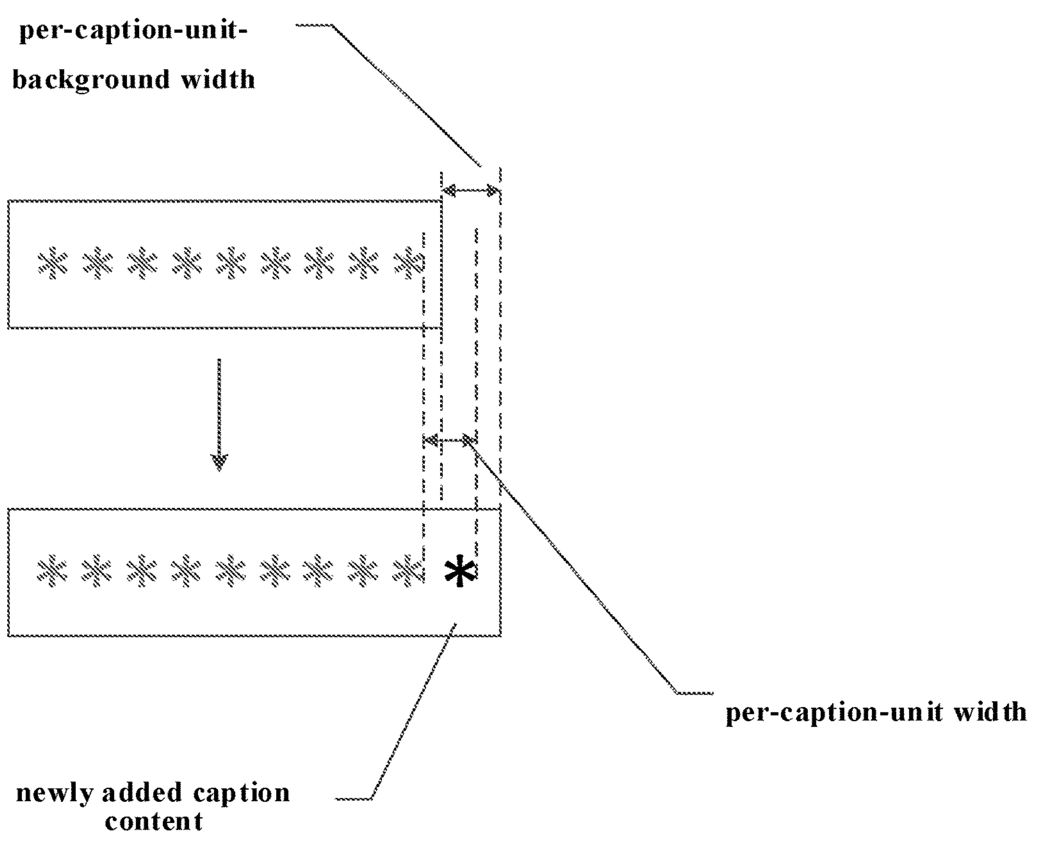
FIG. 12A is a schematic diagram of another scene of caption rendering in a VR space provided in some embodiments of the present disclosure.

That is, as shown in FIG. 12A, when the width of the real-time input caption is less than or equal to the preset maximum caption line width, a real-time background display width is determined in the caption background node according to the width of the real-time input caption. For example, each time a caption content is added and displayed in real time, the corresponding caption content is displayed according to a per-caption-unit width, and the caption background is expanded according to a per-caption-unit-background width. Generally, the per-caption-unit width is less than the per-caption-unit-background width to ensure that the caption content can be visually wrapped by the caption background. Thus, in the width direction, a caption background visually displayed following the displayed caption content is realized.

In some embodiments, when the width of the real-time input caption is greater than to the preset maximum caption line width, in order not to affect the user's visual viewing effect, a display height of the real-time background is determined in the caption background node according to a height of the real-time input caption, based on a preset per-caption-unit height in the caption content node, and a per-caption-unit-background height.

Figure 12B:
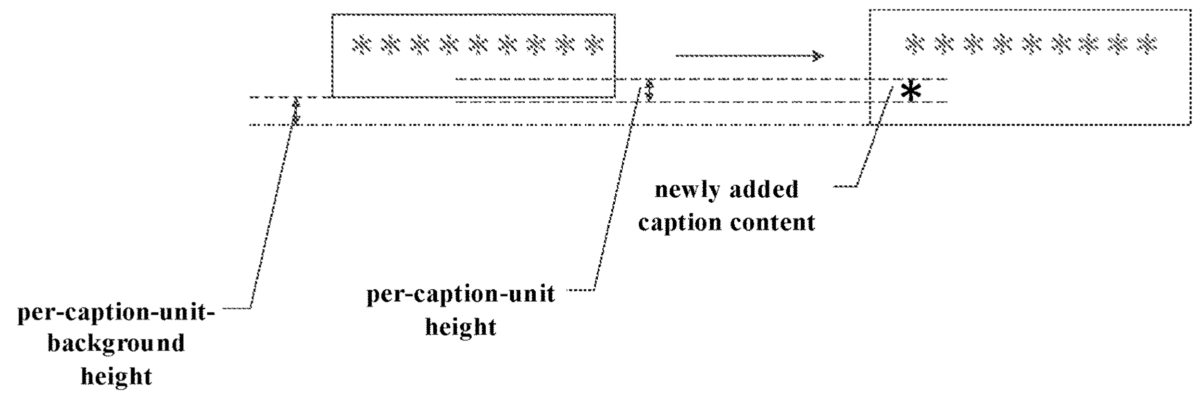
FIG. 12B is a schematic diagram of another scene of caption rendering in a VR space provided in some embodiments of the present disclosure.

That is, as shown in FIG. 12B, if the real-time input caption width is greater than the preset maximum caption line width, the caption content is displayed in a new line. A real-time background display height is determined in the caption background node according to the real-time input caption height. For example, if the real-time input caption width is greater than the preset maximum caption line width, each time a caption content is added and displayed in real time, the corresponding caption content is displayed according to a per-caption-unit height. At the same time, the display height of the caption background is expanded according to a per-caption-unit-background height. Generally, the per-caption-unit height is less than the per-caption-unit-background height to ensure that the caption content can be visually wrapped by the caption background. Thus, in the height direction, a caption background visually displayed following the displayed caption content is realized.

To sum up, the method for caption rendering in a VR space provided in the embodiment of the present disclosure can flexibly determine the target spatial position of the caption content rendered in the VR panoramic space according to the needs of the scene, ensuring a target spatial position tracking the user's current LOS direction, enabling the movement of the caption content following the user's current LOS direction, and ensuring the visual display effect of the caption content.

In order to implement the above embodiment, the present disclosure further provides an apparatus for caption rendering in a VR space.

Figure 13:
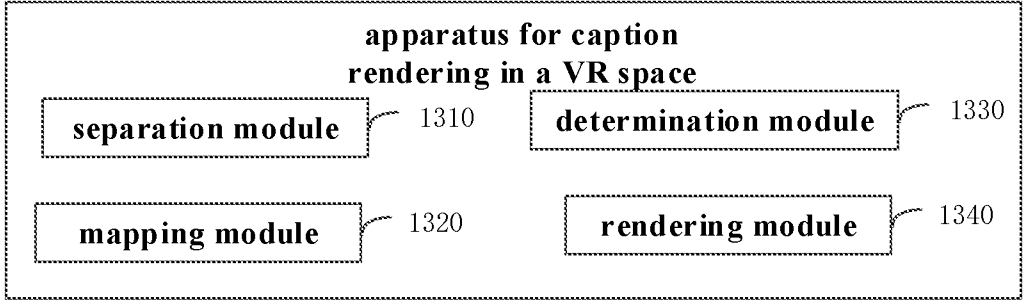
FIG. 13 is a structure diagram of an apparatus for caption rendering in a VR space provided in some embodiments of the present disclosure.

FIG. 13 is a schematic structural diagram of an apparatus for caption rendering in a VR space according to an embodiment of the present disclosure. The apparatus can be implemented by software and/or hardware, and can generally be integrated into an electronic device for caption rendering in a VR space. As shown in FIG. 13, the apparatus comprises: a separation module 1310, a mapping module 1320, a determination module 1330, and a rendering module 1340, wherein the separation module 1310 is used for separating a caption content and a picture content on a currently displayed VR video frame; the mapping module 1320 is used for mapping and rendering the picture content to a VR panoramic space; the determination module 1330 is used for determining a target spatial position in the VR panoramic space according to a user's current LOS direction; the rendering module 1340 is used for rendering the caption content at the target spatial position to generate a spatial caption.

The apparatus for caption rendering in a VR space provided in this embodiment of the present disclosure can execute the method for caption rendering in a VR space provided in any embodiment of the present disclosure, and has corresponding functional modules to implement the method and achieve the beneficial effect of the present disclosure.

In order to implement the above embodiment, the present application further provides a computer program product containing a computer program/instructions that, when executed by a processor, can implement the method for caption rendering in a VR space provided in any embodiment of the present disclosure.

Figure 14:
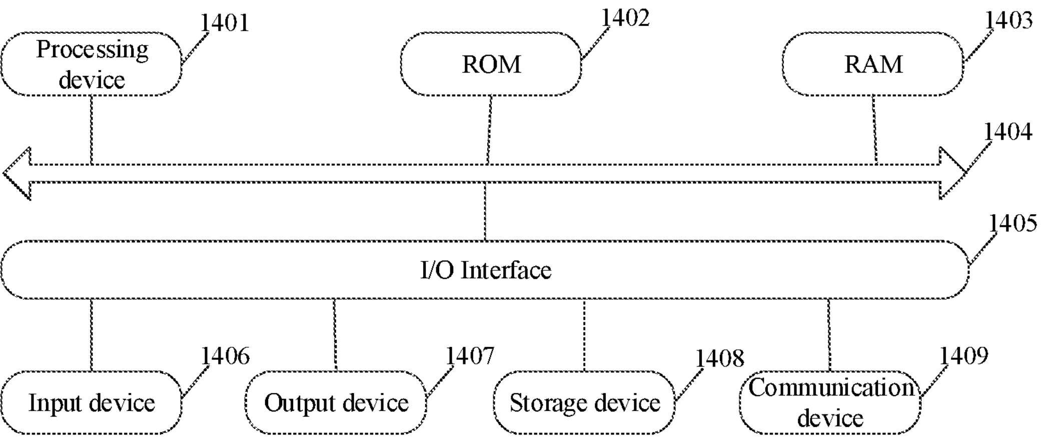
FIG. 14 is a schematic structural diagram of an electronic device provided in some embodiments of the present disclosure.

FIG. 14 is a schematic structural diagram of an electronic device provided in some embodiments of the present disclosure.

FIG. 14 shows a schematic structural diagram of an electronic device 1400 suitable for implementing an embodiment of the present disclosure. The electronic device 1400 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 14 is merely an example and should not impose any limitation on the function and scope of the embodiment of the present disclosure.

As shown in FIG. 14, the electronic device 1400 may comprise a processing device (e.g., a central processing unit, a graphics processor) 1401, which may perform various appropriate actions and processes according to a program stored in Read Only Memory (ROM) 1402 or a program loaded from storage device 1408 into Random Access Memory (RAM) 1403. In RAM 1403, various programs and data required for the operation of the electronic device 1400 are also stored. The processing device 1401, ROM 1402, and RAM 1403 are connected to each other through a bus 1404. An input/output (I/O) interface 1405 is also connected to the bus 1404.

Generally, the following devices can be connected to the I/O interface 1405: input devices 1406 comprising, for example, a touch screen, a touch pad, a keyboard, a mouse, a camera, a microphone, an accelerometer, a gyroscope, etc; output devices 1407 comprising a liquid crystal display (LCD), a speaker, a vibrator, etc.; a storage device 1408 such as a magnetic tape, a hard disk, etc; and a communication device 1409. The communication device 1409 enables the electronic device 1400 to communicate wirelessly or wirelessly with other devices to exchange data. Although FIG. 14 shows the electronic device 1400 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 1409, or installed from the storage device 1408, or from the ROM 1402. When the computer program is executed by the processing device 1401, the above functions defined in the method for caption rendering in a VR space of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that cause, when executed by the electronic device, the electronic device to perform the following steps: separating a caption content and a picture content on a currently displayed VR video frame, mapping and rendering the picture content to a VR panoramic space, and then determining a target spatial position in the VR panoramic space according to the user's current LOS direction, and rendering the caption content at the target spatial position to generate a spatial caption. Therefore, the position of the caption content rendered in the VR space is determined by tracking the user's LOS direction, and a caption is rendered at the corresponding position, thereby improving the user's visual viewing experience.

The computer program code for executing operations of the present disclosure may be complied by any combination of one or more program design languages, the program design languages comprising object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, the present disclosure provides an electronic device, comprising:

a processor;

a memory for storing processor executable instructions;

wherein the processor is used to read the executable instructions from the memory and execute the instructions to implement the method for caption rendering in a VR space provided in any embodiment of the present disclosure.

According to one or more embodiments of the present disclosure, the present disclosure provides a non-transitory computer-readable storage medium on which a computer program is stored, wherein the computer program is used to perform the method for caption rendering in a VR space provided in any embodiment of the present disclosure.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for caption rendering in a virtual reality space, comprising:

separating a caption content and a picture content on a currently displayed virtual reality (VR) video frame, and mapping and rendering the picture content to a VR panoramic space;

determining a target spatial position in the VR panoramic space according to a user's current LOS (line-of-sight) direction, wherein the user's current LOS direction is a ray starting from the user; and rendering the caption content at the target spatial position to generate a spatial caption, wherein determining a target spatial position in the VR panoramic space according to a user's current LOS direction comprises:

determining an initial position of a VR device worn by the user in the VR panoramic space as a center point position of the VR panoramic space;

still taking the initial position as a center point position of the VR panoramic space in response to the VR device being moved;

obtaining a preset radius distance; and starting from the center point position, taking a position extending to the preset radius distance in the user's current LOS direction as the target spatial position.

2. The method according to claim 1, wherein rendering the caption content at the target spatial position to generate a spatial caption comprises:

displaying a background interface matching the caption content synchronously, in response to the caption content input in real time in a corresponding area of the target spatial position, wherein the background interface changes with the caption content input in real time.

3. The method according to claim 2, wherein displaying a background interface matching the caption content comprises synchronously, in response to a caption content input in real time in a corresponding area of the target spatial position:

displaying a background interface having a real-time width matching the caption content according to a preset per-caption-unit width, a per-caption-unit-background width, and a width of a caption input in real time synchronously, in response to a width change of the caption content input in real time in the corresponding area of the target spatial position; and/or displaying a background interface having a real-time height matching the caption content according to a preset per-caption-unit height, a per-caption-unit-background height, and a height of a caption input in real-time synchronously, in response to a height change of the caption content input in real time in the corresponding area of the target spatial position.

4. The method according to claim 1, wherein determining a target spatial position in the VR panoramic space according to a user's current LOS direction comprises:

acquiring a historical spatial position corresponding to a caption content of a previous frame displayed in the VR panoramic space;

acquiring LOS change information of the user's current LOS direction with respect to the user's LOS direction when the previous frame is viewed; and determining the target spatial position according to the LOS change information and the historical spatial position.

5. The method according to claim 4, wherein acquiring LOS change information of the user's current LOS direction with respect to the user's LOS direction when the previous frame is viewed comprises:

acquiring a horizontal axis rotation angle of a camera in the VR device relative to the previous frame in a horizontal direction, wherein the horizontal axis rotation angle is change information from the user's horizontal LOS direction when the previous frame is viewed to the user's horizontal LOS direction when the currently displayed virtual reality video frame is viewed.

6. The method according to claim 5, wherein determining the target spatial position according to the LOS change information and the historical spatial position comprises:

acquiring a center position preset in the VR panoramic space, and using the horizontal axis rotation angle as a center rotation angle from the previous frame to the currently displayed VR video frame;

determining a historical spatial position of the caption content of the previous frame relative to the center position; and determining the target spatial position according to the center position, the historical spatial position, and the center rotation angle.

7. The method according to claim 6, further comprising:

acquiring an initial position of the VR device in the VR panoramic space, wherein the initial position is a center point position in the VR panoramic space; and using the center point position as the center position.

8. The method according to claim 7, further comprising:

using the center point position as the center position constantly in a case that the VR device is moved in the VR panoramic space.

9. The method according to claim 6, further comprising:

obtaining a preset radius distance; and determining an initial spatial position of a caption content of an initial frame relative to the center position according to the center position, the radius distance, and the user's initial LOS direction.

10. The method according to claim 6, further comprising:

providing an engine architecture for spatial caption rendering, wherein the engine architecture comprises a camera node, a rotation root node, and an interface group node, the rotation root node is a parent node of the interface group node, the camera node and the rotation root node are nodes at the same level, and the interface group node varies with a center position and/or center angle of the rotation root node through a parent-child relationship;

wherein:

invoking the camera node to acquire the horizontal axis rotation angle of the camera relative to the previous frame in a case that frame switching occurs, and using the horizontal axis rotation angle as the center rotation angle relative to the previous frame in a case that frame switching occurs;

invoking the rotation root node to acquire a center position in real-time and the center rotation angle relative to the previous frame in a case that frame switching occurs; and invoking the interface group node to acquire a real-time position of a caption content of each frame relative to the center position.

11. The method according to claim 10, wherein the engine architecture comprises:

a caption content node and a caption background node, wherein the interface group node is the parent node of the caption content node and the caption background node, the caption content node and the caption background node are nodes at the same level; the caption content node and the caption background node surround the rotation root node following the interface group node and facing the center, the method further comprising:

invoking the caption content node to obtain real-time input caption information; and invoking the caption background node to obtain background information matching the real-time input caption information.

12. An electronic device, comprising:

a processor;

a memory for storing processor executable instructions;

wherein the processor is used to read the executable instructions from the memory and execute the instructions to implement the following steps of:

separating a caption content and a picture content on a currently displayed virtual reality (VR) video frame, and mapping and rendering the picture content to a VR panoramic space;

determining a target spatial position in the VR panoramic space according to a user's current LOS (line-of-sight) direction, wherein the user's current LOS direction is a ray starting from the user; and rendering the caption content at the target spatial position to generate a spatial caption, wherein determining a target spatial position in the VR panoramic space according to a user's current LOS direction comprises:

determining an initial position of a VR device worn by the user in the VR panoramic space as a center point position of the VR panoramic space;

still taking the initial position as a center point position of the VR panoramic space in response to the VR device being moved;

obtaining a preset radius distance; and starting from the center point position, taking a position extending to the preset radius distance in the user's current LOS direction as the target spatial position.

13. The electronic device according to claim 12, wherein the processor is configured to:

acquire a historical spatial position corresponding to a caption content of a previous frame displayed in the VR panoramic space;

acquire LOS change information of the user's current LOS direction with respect to the user's LOS direction when the previous frame is viewed; and determine the target spatial position according to the LOS change information and the historical spatial position.

14. The electronic device according to claim 13, wherein the processor is configured to:

acquire a horizontal axis rotation angle of a camera in the VR device relative to the previous frame in a horizontal direction, wherein the horizontal axis rotation angle is change information from the user's horizontal LOS direction when the previous frame is viewed to the user's horizontal LOS direction when the currently displayed virtual reality video frame is viewed.

15. The electronic device according to claim 14, wherein the processor is configured to:

acquire a center position preset in the VR panoramic space, and using the horizontal axis rotation angle as a center rotation angle from the previous frame to the currently displayed VR video frame;

determine a historical spatial position of the caption content of the previous frame relative to the center position; and determine the target spatial position according to the center position, the historical spatial position, and the center rotation angle.

16. The electronic device according to claim 15, wherein the processor is configured to:

acquire an initial position of the VR device in the VR panoramic space, wherein the initial position is a center point position in the VR panoramic space; and use the center point position as the center position.

17. The electronic device according to claim 15, wherein the processor is configured to:

obtain a preset radius distance; and determine an initial spatial position of a caption content of an initial frame relative to the center position according to the center position, the radius distance, and the user's initial LOS direction.

18. A non-transitory computer-readable storage medium on which a computer program is stored, wherein the computer program is used to perform the following steps of:

separating a caption content and a picture content on a currently displayed virtual reality (VR) video frame, and mapping and rendering the picture content to a VR panoramic space;

determining a target spatial position in the VR panoramic space according to a user's current LOS (line-of-sight) direction, wherein the user's current LOS direction is a ray starting from the user; and rendering the caption content at the target spatial position to generate a spatial caption, wherein determining a target spatial position in the VR panoramic space according to a user's current LOS direction comprises:

determining an initial position of a VR device worn by the user in the VR panoramic space as a center point position of the VR panoramic space;

still taking the initial position as a center point position of the VR panoramic space in response to the VR device being moved;

obtaining a preset radius distance; and starting from the center point position, taking a position extending to the preset radius distance in the user's current LOS direction as the target spatial position.

* * * * *